Patented Aug. 16, 1932

1,871,723

UNITED STATES PATENT OFFICE

JOHN E. MORROW, OF EAST ST. LOUIS, ILLINOIS, ASSIGNOR TO ALUMINUM COMPANY OF AMERICA, OF PITTSBURGH, PENNSYLVANIA, A CORPORATION OF PENNSYLVANIA

PROCESS FOR THE RECOVERY OF CRYOLITE

No Drawing. Application filed May 29, 1929. Serial No. 367,140.

This invention relates to the recovery of cryolite from waste products in which it is present in substantial amount.

The term "cryolite" as used in the following description and claims includes not only the double fluorides of sodium and aluminum which occur in nature as the mineral cryolite (to which the formula $Na_3AlF_6$ or $3NaF.AlF_3$ is commonly given), but also the mineral chiolite which has a reported formula of $5NaF.3AlF_3$. The term is also used to comprehend artificial double flourides of sodium and aluminum which are known generally as cryolite but which often have a composition varying somewhat from the generally accepted formulas of the natural minerals.

There are several outstanding uses of cryolite, both natural and artificial. The more important of these are in connection with the manufacture of aluminum, in the ceramic industry, and as a flux in the casting and melting of metals, but the mineral is used in many other ways and for other purposes. These various uses or the processes of preparing the mineral for such uses often have incident to them the production of a waste product containing substantial amounts of the mineral. Attempts have been made to recover this valuable material from the waste product; but for the most part they have been unsuccessful, either because of their inherent faults or the expense involved in their operation.

Two examples of such waste are illustrated in the purification of natural cryolite for those purposes which require a product of a high standard of purity, as in the manufacture of enamels, and in the aluminum industry where the cryolite is used as an essential constituent of the electrolytic bath in the Hall process of producing the metal. In the refinement of natural cryolite, the crude material is crushed and passed over concentrating tables to separate from it the undesirable impurities or ingredients which are present. This procedure results in the production of a certain amount of slimes containing that portion (of the cryolite) which has been finely divided or considerably reduced in size in the crushing and concentrating process, and, in addition, a certain proportion of the aforesaid impurities. These slimes have generally been regarded as a waste product.

But the loss of cryolite in such a process as above described is by no means comparable either in magnitude or importance with the loss resulting in the production of aluminum. The electrolytic production of aluminum requires that the process be carried out in a carbon-lined cell, and such lining has a high degree of porosity. The process further requires a bath or electrolyte consisting essentially of cryolite and usually containing small amounts of other fluorides also. The molten bath, lying constantly in contact with the porous carbon lining, is absorbed or retained in the pores of the lining and solidifies therein; with the result that after a certain length of service the lining becomes impregnated with the materials of the bath. Because of this and other reasons, as for example the mechanical disintegration of the lining, it is necessary to reline the electrolytic cells with new carbon at intervals, and this results in the discarding of the bath-impregnated lining. The cryolite contained in the discarded lining has heretofore in the aluminum industry been considered as waste, being mostly unrecoverable by any of the known methods in a commercially feasible manner. This loss is substantial, the average usually being more than a thousand pounds of cryolite in every cell-lining discarded.

I have therefore been led to devise my present invention, which has for its chief object to provide an effective and economical process for recovering cryolite from waste products, especially the slimes and discarded cell linings referred to above. A further object is the recovery of the cryolite in a form in which it may be readily re-used in the manner in which natural or artificial cryolite has heretofore been used. To these and other ends the process comprises treating the waste products containing cryolite, using for the purpose a solution of caustic soda, caustic potash, or other suitable solvent, in such manner as to dissolve substantially all or a large proportion of the sodium-aluminum fluoride compound in a substantially pure form, and thereafter precipitating this compound from said solution in such a way as to separate it from whatever impurities may be present. My invention in its general outline will be best explained in connection with a description of its preferred mode of carrying it out for the recovery of cryolite from carbon or the like and from slimes.

The carbonaceous material containing cryolite, for example the discarded cell linings from the electrolytic cells used in the production of aluminum, is first crushed to a convenient size to make possible its efficient handling in a continuous grinding operation. The crushed or broken up material is fed into a ball mill and is ground to a size which is preferably, in the present instance, such that it will pass a 100-mesh screen. The lining may be ground in the dry condition but it has been found advantageous to grind it wet, for the reason that a useful amount of caustic solution is formed in wet-grinding by the action of the water on any sodium oxides and metallic sodium which are also present in the cell lining as a result of the reduction of a part of the sodium salts in the bath during the electrolytic production of aluminum. Thus the water-carbon slurry resulting from the grinding operation has a certain degree of causticity. Since, however, the quantity of caustic-forming materials present in the lining is not usually sufficient for the purposes of my process, it is advantageous to add to the water before the heating operation such an amount of sodium hydroxide or other suitable alkali as may be necessary to raise the causticity of the slurry to the desired degree. In order to obtain the longest possible period of contact between the weak caustic solution and the cell-lining carbon it is at times advantageous to add sodium hydroxide to the water in which the material is ground. In commercial operation this is not usually necessary and is often not convenient, in which case the requisite amount of sodium hydroxide solution may be added after the grinding operation and precedent to the heating of the slurry.

The slurry is heated in the caustic solution, preferably at a temperature of about 100° C. The liquor resulting from this treatment is filtered off and the carbon and other insoluble constituents of the pot lining are discarded. The dissolved cryolite is then precipitated in any suitable way, preferably by treating the filtrate with carbon dioxide or its equivalent in an autoclave at a temperature between 60 and 100° C. approximately, the carbon dioxide being maintained at a pressure sufficient to quickly saturate the solution, usually at a gauge pressure of 25 or more pounds per square inch, as a result of which the cryolite is substantially precipitated and can be readily removed from the liquor. The cryolite thus recovered is in a form available for further use in the aluminum industry as a constituent of the bath, and for other uses to which cryolite is usually put. It is an advantage of this application of my process that the final liquor from which the cryolite has been precipitated and in which the causticity has been neutralized may be regenerated, as by the addition of lime according to usual practice, and the recausticized solution may then be reused in the digestion operation.

A second example of the use of my process is in the treatment of slimes which have been mentioned as being produced in the refinement of natural cryolite for the ceramic and other industries which require a material of high purity. The slimes contain a substantial amount of finely divided or under-sized cryolite and a certain proportion of the impurities which are contained in the natural cryolite. In one instance of treating slimes of the character mentioned the material was treated at 100° C. with a caustic soda solution containing about 25 grams of $NaOH$ per liter, using the solution in amount giving 20 grams of the slimes per liter of caustic. After treatment, the solution was filtered and the filtrate saturated with carbon dioxide at 165° C. The precipitated cryolite was thereafter filtered off and dried, and in this form is available for use. In this example recovery of about 87 per cent of the cryolite was obtained.

In the two examples of my process noted above, a causticity such as would result from the use of about 25 grams of sodium hydroxide per liter has been found to best meet practical conditions. It will, however, be understood that for good results in the treatment of different types of products containing cryolite, this figure may vary, and the term "weak caustic solution" may therefore be taken to include solutions of such causticity as will dissolve cryolite without substantial decomposition thereof.

The digestion of the waste material containing cryolite with this solution of caustic is preferably carried out at a temperature corresponding to the boiling point of the slurry or slimes but lower temperatures may be employed with, usually, some increase in the period of treatment. Higher temperatures (under pressure) may be used.

The period of time during which treatment should be carried on is also variable and depends upon the material being treated. For instance, in the treatment of cell-lining to recover the cryolite, it has been found that a time of treatment of about three hours produced satisfactory results while in the treatment of cryolite slimes resulting from the refinement of natural cryolite, a period of one hour was found to be suitable. The magnitude of the operation is a factor to be considered, as well as the material to be treated.

The solution of cryolite obtained by the treatment may be treated after filtering with any material which will suitably neutralize the caustic in the solution and thus render the cryolite insoluble. For instance, sulfuric, sulfurous, hydrochloric and other mineral acids, sulfur dioxide, sodium bicarbonate, or carbon dioxide may be used. But for several reasons, I prefer to use carbon dioxide or a substance such as sodium bicarbonate which will produce an equivalent result. When using carbon dioxide as the neutralizing and precipitating agent, it has been found desirable to treat the digestion liquid in an autoclave so that the carbon dioxide may be introduced under a head of pressure which will insure rapid and efficient saturation of the solution with the gas.

Although my process has been described and explained with reference to certain particular applications, I desire to have it understood that the applications given are illustrative merely and that the invention may be carried out in other ways without departure from its spirit as defined by the appended claims.

I claim—

1. The process of treating carbonaceous cell-linings discarded from electrolytic cells used for the electrolysis of fused baths containing cryolite, which comprises grinding the lining in water to reduce said lining to a finely divided condition, adding a causticity-forming substance to the wet mixture, heating said mixture at about the boiling point of the solution contained therein, and thereafter adding acidic material to the solution to neutralize the causticity thereof and precipitate the cryolite contained therein.

2. The process of recovering cryolite values from waste products containing cryolite which comprises treating said waste products with a caustic solution of a strength sufficient to effect a substantial separation of the cryolite and insufficient to decompose the cryolite at the boiling temperature of the solution and dissolving thereby a substantial portion of the cryolite contained in said waste products, separating the solution from the insoluble residue, and thereafter treating the solution with an acidic material to precipitate cryolite therefrom.

3. The process of recovering cryolite values from waste products containing cryolite which comprises treating said waste products with a caustic solution containing substantially 25 grams of caustic soda per liter of solution and dissolving thereby a substantial portion of the cryolite contained in said waste product, separating the solution from the insoluble residue, and thereafter treating the solution with an acidic material.

4. In the process of recovering cryolite from cell linings discarded from electrolytic cells used for the electrolysis of fused baths containing cryolite, the step of treating the lining with a caustic solution of a strength sufficient to effect a substantial separation of the cryolite from the carbon and insufficient to decompose the cryolite at the boiling temperature of the solution.

5. In the process of recovering cryolite from cell linings discarded from electrolytic cells used for the electrolysis of fused baths containing cryolite, treating the discarded material with a caustic solution containing substantially 25 grams of caustic soda per liter of solution.

6. Process of treating carbonaceous cell linings discarded from electrolytic cells used for the electrolysis of fused baths containing cryolite, which comprises grinding the lining, adding to the ground material caustic soda solution of a strength sufficient to effect a substantial separation of the cryolite from the carbonaceous material and insufficient to decompose the cryolite at the boiling temperature of said solution, heating the mixture of ground material and caustic soda solution at about the boiling point of the said solution contained therein, and thereafter adding acidic material to the solution to neutralize the causticity thereof and precipitate the cryolite contained therein.

7. Process of treating carbonaceous cell linings discarded from electrolytic cells used for the electrolysis of fused baths containing cryolite, which comprises grinding the lining, adding to the ground material a solution of caustic soda containing substantially 25 grams of caustic per liter of solution, heating the mixture at about the boiling point of the solution, and thereafter adding acidic material to the solution to neutralize the causticity thereof and precipitate the cryolite contained therein.

In testimony whereof I hereto affix my signature.

JOHN E. MORROW.